United States Patent
Goto

(10) Patent No.: US 11,643,085 B2
(45) Date of Patent: May 9, 2023

(54) DRIVE ASSIST APPARATUS AND DATA COLLECTION SYSTEM

(71) Applicant: SUBARU CORPORATION, Tokyo (JP)

(72) Inventor: Ikuo Goto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 160 days.

(21) Appl. No.: 17/220,293

(22) Filed: Apr. 1, 2021

(65) Prior Publication Data

US 2021/0309233 A1 Oct. 7, 2021

(30) Foreign Application Priority Data

Apr. 3, 2020 (JP) .............................. JP2020-067167

(51) Int. Cl.
*B60W 40/08* (2012.01)
*B60W 50/14* (2020.01)
(Continued)

(52) U.S. Cl.
CPC ............ *B60W 40/08* (2013.01); *B60W 50/14* (2013.01); *G06F 3/013* (2013.01); *G06V 20/56* (2022.01);
(Continued)

(58) Field of Classification Search
CPC ................ B60W 40/08; B60W 50/14; B60W 2050/143; B60W 2050/146;
(Continued)

(56) References Cited

U.S. PATENT DOCUMENTS

2017/0102765 A1* 4/2017 Yoneda ............... G06Q 30/0269
2017/0329329 A1* 11/2017 Kamhi ................ G05D 1/0088

FOREIGN PATENT DOCUMENTS

JP 2008-013070 A 1/2008
JP 2012-112853 A 6/2012

OTHER PUBLICATIONS

Espacenet English translation of JP2012112853A description (Year: 2012).*
PE2E English translation WO2018163491A1 (Year: 2018).*

* cited by examiner

*Primary Examiner* — James J Lee
*Assistant Examiner* — Andrew Sang Kim
(74) *Attorney, Agent, or Firm* — McDermott Will & Emery LLP

(57) ABSTRACT

A drive assist apparatus includes a processor and a storage. The processor includes a line-of-sight detector, an emotion estimator, and a notification processing unit. The line-of-sight detector detects information on a line of sight of one or both of a vehicle occupant present in a vehicle and a traffic participant present around the vehicle. The emotion estimator estimates an emotion of the one or both of the vehicle occupant and the traffic participant. The storage stores, when the estimated emotion is detected as a positive emotion, data on a viewpoint including information on a position of the vehicle on map data and information on the line of sight. The notification processing unit makes, on the basis of the data on the viewpoint stored in the storage, a notification of information on a direction to notice to the vehicle occupant present in the vehicle traveling through a location corresponding to the viewpoint.

7 Claims, 7 Drawing Sheets

(51) Int. Cl.
   *G06F 3/01*      (2006.01)
   *G06V 20/56*     (2022.01)
   *G06V 40/18*     (2022.01)
   *G06V 40/20*     (2022.01)

(52) U.S. Cl.
   CPC .............. *G06V 40/18* (2022.01); *G06V 40/20* (2022.01); *B60W 2050/143* (2013.01); *B60W 2050/146* (2013.01); *B60W 2540/22* (2013.01); *B60W 2540/225* (2020.02); *B60W 2556/10* (2020.02)

(58) Field of Classification Search
   CPC ....... B60W 2540/22; B60W 2540/225; B60W 2556/10; B60W 40/00; G06F 3/013; G06F 2203/011; G06V 20/56; G06V 40/18; G06V 40/20; G06V 20/597; G01C 21/3697; G01C 21/3811; G09B 29/007
   See application file for complete search history.

DRIVE ASSIST APPARATUS AND DATA COLLECTION SYSTEM

CROSS-REFERENCE TO RELATED APPLICATIONS

The present application claims priority from Japanese Patent Application No. 2020-067167 filed on Apr. 3, 2020, the entire contents of each of which are hereby incorporated by reference.

BACKGROUND

The technology relates to a drive assist apparatus and a data collection system.

In many situations, an excellent landscape including an island or a historical architecture is found over a seashore from a vehicle traveling at a distance. Not to miss such a scenic landscape, it is necessary to know the viewpoint in advance and direct the line of sight in an appropriate direction at an appropriate timing.

Japanese Unexamined Patent Application Publication (JP-A) No. 2012-112853, for example, discloses an information processor for accurately transmitting information on the emotional state of a user in each location. For example, the technique disclosed in JP-A No. 2012-112853 transmits, from a navigator of the vehicle to a center, positional data of the vehicle at the time when the detection results of user's biological information detected by various sensors satisfy a predetermined condition, and the biological information detected at the position. The user's emotional state is derived from the positional data and the biological information transmitted to the center, which is then correlated with the location at which the biological information is detected. Among the emotional states correlated with the location, the most common emotional state is transmitted as a representative emotional state to the vehicle. The location, such as a landscape outside the vehicle, to which the user will have a predetermined emotion is thereby presented.

Additionally, JP-A No. 2008-13070 discloses a vehicle display apparatus that provides appropriate information necessary for a driver. For example, the vehicle display apparatus disclosed in JP-A No. 2008-13070 includes a line of sight detector that detects the line of sight of the driver, and a gaze target identification unit that identifies a gaze target at which the driver is gazing on the basis of the line of sight of the driver. The vehicle display apparatus further includes a display processor and a display. The display processor determines the type of information to be displayed on the basis of the type of the gaze target identified by the gaze target identifying unit. The display displays the information determined by the display processor.

SUMMARY

An aspect of the technology provides a drive assist apparatus including a processor and a storage. The processor includes a line-of-sight detector, an estimation estimator, and a notification processing unit. The line-of-sight detector is configured to detect information on a line of sight of one or both of a vehicle occupant present in a vehicle and a traffic participant present around the vehicle. The emotion estimator is configured to estimate an emotion of the t one or both of the vehicle occupant and the traffic participant. The storage is configured to store, when the emotion estimated by the emotion estimator is detected as a positive emotion, data on a viewpoint including information on a position of the vehicle on map data and information on the line of sight. The notification processing unit is configured to make, on the basis of the data on the viewpoint stored in the storage, a notification of information on a direction to notice to the vehicle occupant present in the vehicle traveling through a location corresponding to the viewpoint.

An aspect of the technology provides a data collection system including a drive assist apparatus and an administrative server. The drive assist apparatus is configured to be mounted on a vehicle, and includes a processor, a storage, and a first communicator. The administrative server is configured to communicate with the drive assist apparatus, and includes a database and a second communicator and. The processor includes a line-of-sight detector, an estimation estimator, and a notification processing unit. The line-of-sight detector is configured to detect information on a line of sight of one or both of a vehicle occupant present in a vehicle and a traffic participant present around the vehicle. The emotion estimator is configured to estimate an emotion of the one or both the vehicle occupant and the traffic participant. The storage is configured to store, when the emotion estimated by the emotion estimator is detected as a positive emotion, data on a viewpoint including information on a position of the vehicle on map data and information on the line of sight. The notification processing unit is configured to make, on the basis of the data on the viewpoint stored in the storage, a notification of information on a direction to notice to the vehicle occupant present in the vehicle traveling through a location corresponding to the viewpoint. The first communicator is configured to transmit the data on the viewpoint to the drive assist apparatus. The database is configured to store the data on the viewpoint received from the drive assist apparatus. The second communicator is configured to transmit the data on the viewpoint stored in the storage to the drive assist apparatus.

An aspect of the technology provides a drive assist apparatus including circuitry and a storage. The circuitry is configured to detect information on a line of sight of one or both of a vehicle occupant present in a vehicle and a traffic participant present around the vehicle, and estimate an emotion of the one or both of the vehicle occupant and the traffic participant. The storage is configured to store, when the estimated emotion is detected as a positive emotion, data on a viewpoint including information on a position of the vehicle on map data and information on the line of sight. The circuitry is further configured to make, on the basis of the data on the viewpoint stored in the storage, a notification of information on a direction to notice to the vehicle occupant present in the vehicle traveling through a location corresponding to the viewpoint.

An aspect of the technology provides a data collection system including a drive assist apparatus and an administrative server. The drive assist apparatus is configured to be mounted on a vehicle, and includes circuitry, a storage, and a first communicator. The administrative server is configured to communicate with the drive assist apparatus, and includes a database and a second communicator. The circuitry is configured to detect information on a line of sight of one or both of a vehicle occupant present in a vehicle and a traffic participant present around the vehicle, and estimate an emotion of the one or both of the vehicle occupant and the traffic participant. The storage is configured to store, when the estimated emotion is detected as a positive emotion, data on a viewpoint including information on a position of the vehicle on map data and information on the line of sight. The circuitry is further configured to make, on the basis of the data on the viewpoint stored in the storage, a notification of information on a direction to notice to the vehicle occupant present in the vehicle traveling through a location corresponding to the viewpoint. The first communicator is configured to transmit the data on the viewpoint to the drive assist apparatus. The database is configured to store the data on the viewpoint received from the drive assist apparatus. The second communicator is configured to transmit the data on the viewpoint stored in the storage to the drive assist apparatus.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Data on a viewpoint with a scenic landscape can be obtained by applying the techniques disclosed in JP-A Nos. 2012-112853 and 2008-13070. However, if it is unknown in which direction to notice, the user needs to determine the direction to notice by directing his/her line of sight in different directions when reaching the viewpoint. The user looking for the location with a scenic landscape when reaching the viewpoint is likely to miss the scenic landscape which is viewable only for a moment from a traveling vehicle. This can make the user feel unpleasant.

It is desirable to provide a drive assist apparatus and a data collection system that provide appropriate information to an occupant in a traveling vehicle.

Hereinafter, some example embodiments of the technology are described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

[Data Collection System]

Figure 1:
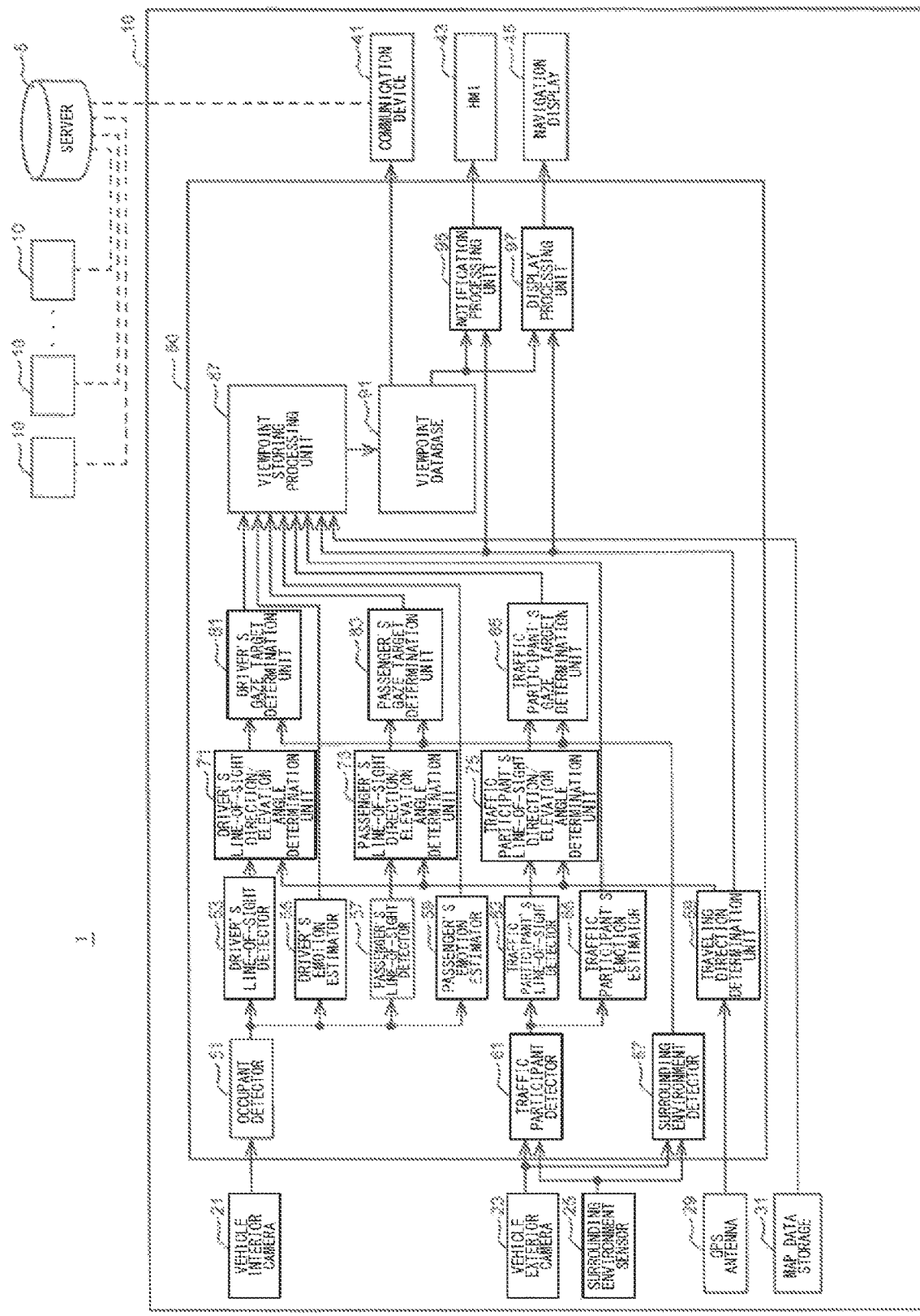
FIG. 1 is a block diagram illustrating an exemplary configuration of a data collection system according to one example embodiment of the technology.

First, an exemplary configuration of a data collection system 1 according to an example embodiment of the technology will now be described. FIG. 1 is a block diagram illustrating the exemplary configuration of the data collection system 1 according to the example embodiment of the technology.

The data collection system 1 includes a drive assist apparatus 10 mounted on a vehicle and an administrative server 5 configured to communicate with the drive assist apparatus 10. The drive assist apparatus 10 may be mounted on each vehicle including the data collection system 1. The administrative server 5 in the data collection system 1 may accumulate viewpoint data collected by the drive assist apparatuses 10 mounted on each vehicle, and provide the viewpoint data to the respective drive assist apparatuses 10. When receiving the viewpoint data from the administrative server 5, the drive assist apparatus 10 notifies an occupant in the vehicle (hereinafter also referred to as a vehicle occupant) of the viewpoint data. Accordingly, it is possible to provide appropriate information to the vehicle occupant when the vehicle passes through the viewpoint. This helps prevent the vehicle occupant from missing the scenic landscape.

According to the data collection system 1 of the present example embodiment, the direction to notice may be presented to the vehicle occupant in each vehicle passing through the viewpoint. Accordingly, there is no need for the vehicle occupant to direct his/her line of sight in different directions when reaching the viewpoint. This allows the vehicle occupant to enjoy the scenic landscape at an appropriate timing.

[1. Exemplary Configuration of Drive Assist Apparatus]

An exemplary configuration of the drive assist apparatus 10 will now be described in detail.

The drive assist apparatus 10 is mounted on a vehicle. The drive assist apparatus 10 collects viewpoint data and provides the viewpoint data to a driver of the vehicle.

The drive assist apparatus 10 may include a vehicle interior camera 21, a vehicle exterior camera 23, a surrounding environment sensor 25, a global positioning system (GPS) antenna 29, a map data storage 31, a communication device 41, a human machine interface (HMI) 43, a navigation display 45, and an information processor 50. The vehicle interior camera 21, the vehicle exterior camera 23, the surrounding environment sensor 25, the GPS antenna 29, the map data storage 31, the communication device 41, the HMI 43, and the navigation display 45 may be directly coupled to the information processor 50 via a controller area network (CAN), a local interconnect network (LIN), or another communication network. In one embodiment, the information processor 50 may serve as a "processor".

[1-1. Vehicle Interior Camera]

The vehicle interior camera 21 may generate image data of the interior compartment of the vehicle. The vehicle interior camera 21 may include an imaging device such as a charge coupled device (CCD) or a complementary metal oxide semiconductor (CMOS). The vehicle interior camera 21 may transmit the generated image data to the information processor 50. The vehicle interior camera 21 may be disposed such that at least one occupant in the vehicle compartment is present within an imaging range. The single vehicle interior camera 21 may include one or more cameras.

[1-2. Vehicle Exterior Camera]

The vehicle exterior camera 23 may generate an image data of a surrounding environment around the vehicle. The image data may include image data of the landscape around the vehicle. The vehicle exterior camera 23 may also serve as a safety device for the vehicle or a device for collecting the viewpoint data. Like the vehicle interior camera 21, the vehicle exterior camera 23 may include an imaging device, such as a CCD or CMOS. The vehicle exterior camera 23 may transmit the generated image data to the information processor 50. The vehicle exterior camera 23 may include one or more cameras mounted such that an image of at least one of a front environment, a side environment, and/or a rear environment of the vehicle is captured.

[1-3. Surrounding Environment Sensor]

The surrounding environment sensor 25 may detect a person or an obstacle present around the vehicle. The surrounding environment sensor 25 may include at least one of a high-frequency radar sensor, an ultrasonic sensor, and/or a LiDAR. Examples of the obstacle to be detected may include another vehicle, a bicycle, a building, a traffic sign, a traffic light, a natural object, and another object present around the vehicle.

[1-4. GPS Antenna]

The GPS antenna 29 may receive satellite signals from the GPS satellites. The GPS antenna 29 may transmit data on the position (hereinafter positional data) of the vehicle on map data included in the satellite signals to the information processor 50. Note that another antenna that receives satellite signals identifying the position of the vehicle from another satellite system may be provided in place of the GPS antenna 29.

[1-5. Communication Device]

The communication device 41 may be an interface to establish communication between the information processor 50 and the administrative server 5 via a mobile communication network or another communication network. The communication device 41 may be an interface having specifications in accordance with the communication network. In one embodiment, the communication device 41 may serve as a "first communicator".

[1-6. HMI]

The HMI 43 may be controlled by the information processor 50 and notify the vehicle occupant of various pieces of information by means of visual displaying or audio outputting, for example. For example, the HMI 43 may include a display or a speaker provided in an instrument panel. The HMI 43 may further include a head-up display (HUD) that superimposes the information on the landscape around the vehicle onto the front windshield of the vehicle.

[1-7. Navigation Display]

The navigation display 45 may display map data. The navigation display 45 may be controlled by the information processor 50 and display the map data on which the collected viewpoint data have been reflected. The navigation display 45 may be an optical panel, such as a liquid crystal panel, for example. Alternatively, the navigation display 45 may be a part of the HMI 43.

[1-8. Information Processor]

The information processor 50 may include an arithmetic operation unit, such as a central processing unit (CPU) or a micro processing unit (MPU), and an imaging processing unit, such as a graphic processing unit (GPU). The arithmetic operation unit may perform various calculations by executing programs stored in the storage. Note that a part or the entirety of the information processor 50 may be configured by updatable software such as firmware, or a program module executed in response to a command from the CPU, for example.

In the present example embodiment, the information processor 50 may include an occupant detector 51, a traffic participant detector 61, a surrounding environment detector 67, and a traveling direction determination unit 69. The information processor 50 may further include a driver's line-of-sight detector 53, a driver's emotion estimator 55, a passenger's line-of-sight detector 57, a passenger's emotion estimator 59, a traffic participant's line-of-sight detector 63, and a traffic participant's emotion estimator 65. The information processor 50 may further include a driver's line-of-sight direction/elevation angle determination unit 71, a passenger's line-of-sight direction/elevation angle determination unit 73, and a traffic participant's line-of-sight direction/elevation angle determination unit 75. The information processor 50 may further include a driver's gaze target determination unit 81, a passenger's gaze target determination unit 83, and a traffic participant's gaze target determination unit 85. The information processor 50 may further include a viewpoint storing processing unit 87, a notification processing unit 95, and a display processing unit 97. These units may be functions achieved by programs executed by the arithmetic operation unit or the image processing unit.

The information processor 50 may further include a viewpoint database 91. The viewpoint database 91 may include a memory, such as a random access memory (RAM), or a storage medium, such as a hard disk drive (HDD), a compact disc (CD), a digital versatile disc (DVD), a solid state drive (SSD), a universal serial bus (USB), a flash drive, or another storage device. In one embodiment, the viewpoint database 91 may serve as a "storage".

The information processor 50 may further include a non-illustrated memory, such as a RAM or a read only memory (ROM), that stores software programs to be executed by the arithmetic operation unit or the image processing unit, various parameters to be used in calculations, acquired information, and calculation results, for example.

[1-8-1. Occupant Detector]

The occupant detector 51 may detect the vehicle occupant on the basis of the image data received from the vehicle interior camera 21. For example, the occupant detector 51 may detect the vehicle occupant by identifying the presence of a human face through image processing on the image data received from the vehicle interior camera 21. Further, the occupant detector 51 may determine which the detected vehicle occupant corresponds to, a driver or a passenger, by detecting the seated position of the detected vehicle occupant on the basis of the image data received from the vehicle interior camera 21. The occupant detector 51 may detect the seated position of the driver or the passenger in the vehicle by detecting the distance from the vehicle interior camera 21 to the driver or the passenger and the relative position between the vehicle interior camera 21 and the driver or the passenger on the basis of the image data. The occupant detector 51 may identify the detected individual vehicle occupant through a feature quantity analysis of the facial image.

[1-8-2. Traffic Participant Detector]

The traffic participant detector 61 may detect a traffic participant present around the vehicle on the basis of the image data received from the vehicle exterior camera 23. For example, the traffic participant detector 61 may detect a traffic participant by identifying the presence of a human face around the vehicle through image processing on the image data received from the vehicle exterior camera 23. The term "traffic participant" used herein refers to a pedestrian, a person riding on a bicycle, or an occupant in another vehicle, for example. The traffic participant detector 61 may calculate a distance from the own vehicle to the traffic participant and a relative position between the own vehicle and the traffic participant.

[1-8-3. Surrounding Environment Detector]

The surrounding environment detector 67 may detect information on the surrounding environment around the vehicle on the basis of the image data received from the vehicle exterior camera 23. For example, the surrounding environment detector 67 may detect a specific landscape or scenery viewable from the vehicle by performing image processing on the image data including the landscape image received from the vehicle exterior camera 23 through an object detection method. Alternatively or optionally, the surrounding environment detector 67 may detect the specific landscape or scenery viewable from the vehicle on the basis of information on buildings detected by the surrounding environment sensor 25, for example. Further, the surrounding environment detector 67 may specify a part of the information on the surrounding environment around the vehicle on the basis of the information received from an external device via an inter-vehicle communication, a road-to-vehicle communication, a mobile communication network, or another communication means. Alternatively, the surrounding environment detector 67 may specify a part of the information on the surrounding environment around the vehicle by identifying the position of the vehicle on the map data on the basis of the positional data of the vehicle received from the GPS antenna 29.

[1-8-4. Traveling Direction Determination Unit]

The traveling direction determination unit 69 may determine the traveling direction of the vehicle on the basis of the positional data of the vehicle received from the GPS antenna 29. For example, the traveling direction determination unit 69 may determine the traveling direction of the vehicle on the basis of a change in position of the vehicle. The road on which the vehicle is traveling and the traveling direction in which the vehicle is traveling may be thereby identified.

[1-8-5. Driver's Line-of-Sight Detector]

In a case where a driver is detected, the driver's line-of-sight detector 53 may detect the line of sight of the driver on the basis of the image data received from the vehicle interior camera 21. For example, the driver's line-of-sight detector 53 may detect the line of sight of the driver by identifying a turning direction of the driver's head and a moving direction of the driver's eyes through image processing on the image data received from the vehicle interior camera 21.

[1-8-6. Driver's Emotion Estimator]

In a case where the driver is detected, the driver's emotion estimator 55 may estimate a driver's emotion on the basis of the image data received from the vehicle interior camera 21. For example, the driver's emotion estimator 55 may estimate the driver's estimation by analyzing facial data of the driver through a facial analysis based on the FACS theory, for example. The driver's emotion may be estimated in accordance with predetermined levels defined for each emotion including delight, anger, sorrow, and pleasure, for example. In the present example embodiment, the driver's emotion estimator 55 may estimate at least a positive emotion, such as delight or pleasure, of the driver. Alternatively, the driver's emotion may be estimated through another method. For example, the driver's emotion estimator 55 may estimate the driver's emotion by using a biological sensor that detects biological data, such as a brain wave, a pulse rate, or a heart rate, in place of or in addition to the vehicle interior camera 21.

[1-8-7. Passenger's Line-of-Sight Detector]

In a case where a passenger other than the driver is detected, the passenger's line-of-sight detector 57 may detect the line of sight of the passenger on the basis of the image data received from the vehicle interior camera 21. For example, the passenger's line-of-sight detector 57 may detect the line-of-sight of the passenger by identifying a turning direction of the passenger's head and a moving direction of the passenger's eyes through image processing on the image data received from the vehicle interior camera 21.

[1-8-8. Passenger's Emotion Estimator]

In a case where the passenger other than the driver is detected, the passenger's emotion estimator 59 may estimate a passenger's emotion on the basis of the image data received from the vehicle interior camera 21. For example, the passenger's emotion estimator 59 may estimate the passenger's emotion by analyzing facial data of the passenger through the facial analysis based on the FACS theory, for example. The passenger's emotion maybe estimated in accordance with predetermined levels defined for each emotion including delight, anger, sorrow, and pleasure, for example. In the present example embodiment, the passenger's emotion estimator 59 may estimate at least a positive emotion, such as delight or pleasure, of the passenger. Alternatively, the passenger's emotion may be estimated through another method. For example, the passenger's emotion estimator 59 may estimate the passenger's emotion by using a biological sensor that detects biological data such as a brain wave, a pulse rate, and a heart rate, in place or or in addition to the vehicle interior camera 21.

[1-8-9. Traffic Participant's Line-of-Sight Detector]

In a case where a traffic participant present around the vehicle is detected, the traffic participant's line-of-sight detector 63 may detect the line of sight of the traffic participant on the basis of the image data received from the vehicle exterior camera 23. For example, the traffic participant's line-of-sight detector 63 may detect the line of sight of the traffic participant by performing image processing on the image data received from the vehicle exterior camera 23 by identifying a turning direction of the traffic participant's head and a moving direction of the traffic participant's eyes.

[1-8-10. Traffic Participant's Emotion Estimator]

In a case where the traffic participant present around the vehicle is detected, the traffic participant's emotion estimator 65 may estimate a traffic participant's emotion on the basis of the image data received from the vehicle exterior camera 23. For example, the traffic participant's emotion estimator 65 may estimate the traffic participant's emotion by analyzing facial data of the traffic participant through the facial analysis based on the FACS theory, for example. The traffic participant's emotion may be estimated in accordance with predetermined levels defined for each emotion including delight, anger, sorrow, and pleasure, for example. In the present example embodiment, the traffic participant's emotion estimator 65 may estimate at least a positive emotion, such as delight or pleasure, of the traffic participant. Alternatively, the traffic participant's emotion may be estimated through another method.

[1-8-11. Driver's Line-of-Sight Direction/Elevation Angle Determination Unit]

In a case where the driver is detected, the driver's line-of-sight direction/elevation angle determination unit 71 may determine the direction and elevation angle of the line of sight of the driver. For example, the driver's line-of-sight direction/elevation angle determination unit 71 may determine the direction and elevation angle of the line of sight of the driver on the basis of the information on the line of sight of the driver detected by the driver's line-of-sight detector 53 and the information on the traveling position and traveling direction of the vehicle detected by the traveling direction determination unit 69. For example, the driver's line-of-sight direction/elevation angle determination unit 71 may determine the position of the driver on the map data on the basis of the positional data of the vehicle on the map data and the information on the seated position of the driver in the vehicle. On the basis of the information on the position of the driver and the information on the line of sight of the driver, the driver's line-of-sight direction/elevation angle determination unit 71 may identify the direction of the line of sight of the driver on the map data and calculate the elevation angle of the line of sight of the driver in a three-dimensional space having an x-axis extending along the length of the vehicle, a y-axis extending along the width of the vehicle, and a z-axis extending along the height of the vehicle.

[1-8-12. Passenger's Line-of-Sight Direction/Elevation Angle Determination Unit]

In a case where the passenger is detected, the passenger's line-of-sight direction/elevation angle determination unit 73 may determine the direction and elevation angle of the line of sight of the passenger. For example, the passenger's line-of-sight direction/elevation angle determination unit 73 may determine the direction and elevation angle of the line of sight of the passenger on the basis of the information on the line of sight of the passenger detected by the passenger's line-of-sight detector 57 and the information on the traveling position and traveling direction of the vehicle detected by the traveling direction determination unit 69. For example, the passenger's line-of-sight direction/elevation angle determination unit 73 may determine the position of the passenger on the map data on the basis of the positional data of the vehicle on the map data and the information on the seated position of the passenger in the vehicle. On the basis of the information on the position of the passenger and the information on the line of sight of the passenger, the passenger's line-of-sight direction/elevation angle determination unit 73 may identify the direction of the line of sight of the passenger on the map data and calculate the elevation angle of the line of sight of the passenger in the three-dimensional space having the x-axis extending along the length of the vehicle, the y-axis extending along the width of the vehicle, and the x-axis extending along the height of the vehicle.

[1-8-3. Traffic Participant's Line-of-Sight Direction/Elevation Angle Determination Unit In a case where the traffic participant is detected, the traffic participant's line-of-sight direction/elevation angle determination unit 75 may determine the direction and elevation angle of the line of sight of the traffic participant. For example, the traffic participant's line-of-sight direction/elevation angle determination unit 75 may determine the direction and elevation angle of the line of sight of the traffic participant on the basis of the information on the line of sight of the traffic participant detected by the traffic participant's line-of-sight detector 63 and the information on the traveling position and traveling direction of the vehicle detected by the traveling direction determination unit 69. For example, on the basis of the information on the position of the traffic participant and the information on the line of sight of the traffic participant, the traffic participant's line-of-sight direction/elevation angle determination unit 75 may identify the direction of the line of sight of the traffic participant on the map data and calculate the elevation angle of the line of sight of the traffic participant in the three-dimensional space having the x-axis extending along the length of the vehicle, the y-axis extending along the width of the vehicle, and the x-axis extending along the height of the vehicle.

[1-8-14. Driver's Gaze Target Determination Unit]

In a case where the driver is detected, the driver's gaze target determination unit 81 may determine a gaze target at which the driver is gazing. For example, the driver's gaze target determination unit 81 may determine a gaze target present in front of the line of sight of the driver on the basis of the information on the direction and elevation angle of the line of sight of the driver detected by the driver's line-of-sight direction/elevation angle determination unit 71 and the information on the specific landscape or scenery viewable from the vehicle detected by the surrounding environment detector 67. Optionally, the driver's gaze target determination unit 81 may refer to the information stored in the map data storage 31 to identify the gaze target present in front of the line of sight of the driver.

[1-8-15. Passenger's Gaze Target Determination Unit]

In a case where the passenger is detected, the passenger's gaze target determination unit 83 may determine a gaze target at which the passenger is gazing. For example, the passenger's gaze target determination unit 83 may determine a gaze target present in front of the line of sight of the passenger on the basis of the information on the direction and elevation angle of the line of sight of the passenger detected by the passenger's line-of-sight direction/elevation angle determination unit 73 and the information on the specific landscape or scenery viewable from the vehicle detected by the surrounding environment detector 67. Optionally, the passenger's gaze target determination unit 83 may refer to the information stored in the map data storage 31 to identify the gaze target present in front of the line of sight of the passenger.

[1-8-16. Traffic Participant's Gaze Target Determination Unit]

In a case where the traffic participant is detected, the traffic participant's gaze target determination unit 85 may determine a gaze target at which the traffic participant is gazing. For example, the traffic participant's gaze target determination unit 85 may determine a gaze target present in front of the line of sight of the traffic participant on the basis of the information on the direction and elevation angle of the line of sight of the traffic participant detected by the traffic participant's line-of-sight direction/elevation angle determination unit 75 and the information on the specific landscape or scenery viewable from the vehicle detected by the surrounding environment detector 67. Optionally, the traffic participant's gaze target determination unit 85 may refer to the information stored in the map data storage 31 to identify the gaze target present in front of the line of sight of the traffic participant.

[1-8-17. Viewpoint Storing Processing Unit]

The viewpoint storing processing unit 87 may store the viewpoint data in the viewpoint database 91. The viewpoint data may include the positional data of the own vehicle on the map data and the information on the line of sight of the driver, passenger, or traffic participant at the time when a positive emotion of the driver, passenger, or traffic participant was detected. For example, the viewpoint storing processing unit 87 may store the viewpoint data in the viewpoint database 91 in a case where the driver's emotion estimator 55 determines that the driver's emotion is a positive emotion and where the driver's gaze target determination unit 81 determines that a specific gaze target is present. Likewise, the viewpoint storing processing unit 87 may store the viewpoint data in the viewpoint database 91 in a case where the passenger's emotion estimator 59 or the traffic participant's emotion estimator 65 determines that the passenger's or traffic participant's emotion is a positive emotion and where the passenger's gaze target determination unit 83 or the traffic participant's gaze target determination unit 85 determines that a specific gaze target is present.

The determination as to whether the emotion of the driver is a positive emotion may be made on the basis that whether the level of the estimated emotion changes to a higher level of the "delight" emotion or the "pleasure" emotion. The degree of the interest of the driver in the landscape may also be thereby estimated, for example. Alternatively, the determination as to whether the driver's emotion is a positive emotion may be made on the basis of the proportion of a time interval during which the driver estimated to have the "delight" or "pleasure" emotion directs his/her line of sight in a specific direction to a time interval during which the vehicle travels in a predetermined traveling or walking section. Likewise, the determination as to whether the emotion of the traffic participant, such as a pedestrian or a person riding on a bicycle, is a positive emotion may be made on the basis of the proportion of a time interval during which the traffic participant estimated to have the "delight" or "pleasure" emotion directs his/her line of sight in a specific direction to a predetermined time interval.

The viewpoint data includes the information on the line of sight, such as the information on the direction and elevation angle of the line of sight. The viewpoint data further includes the positional data of the vehicle on the map data identified on the basis of the output signal from the GPS antenna 29 and the data stored in the map data storage 31. The viewpoint data may further include the information on the landscape or scenery at which the vehicle occupant or the traffic participant was gazing. The viewpoint storing processing unit 87 may store the viewpoint data together with the information on the level of the "delight" or "pleasure" emotion of the driver or traffic participant.

Further, the viewpoint storing processing unit 87 may store the viewpoint data together with information on at least one of the season, calendar, and/or time when the driver or the traffic participant had the positive position. For example, scenery of autumn leaves or snow mountains can be seen only in a limited season, some kinds of scenery can be seen only in a daytime, and other kinds of scenery, such as an illumination spot, can be seen only in a night-time. Thus, the viewpoint data stored together with the information on the season, calendar, and time may be notified in a limited season or time.

[1-8-18. Notification Processing Unit]

The notification processing unit 95 may cause the HMI 43 to make a notification of the direction to notice to the vehicle occupant when the vehicle travels through the viewpoint of which data is stored in the viewpoint database 91. For example, when the vehicle travels through the viewpoint, the notification processing unit 95 may identify a possible gaze target, such as a landscape or scenery, on the basis of the viewpoint data stored in the viewpoint database 91, and also identify the direction to notice on the basis of the current position and current traveling direction of the own vehicle. The information on the direction to notice may include the information on the elevation angle of the line of sight included in the viewpoint data. The notification processing unit 95 may notify the vehicle occupant of the identified direction to notice.

Such notification may be made by means of one or both of audio outputting and visual displaying, for example. In a case where the notification is made by means of visual displaying, the notification may be made on the HUD so as to be easily recognized by the vehicle occupant, for example. The notification processing unit 95 may notify the vehicle occupant of the direction to notice by displaying an icon or a diagram that indicates a specific target to notice on the HUD. This allows the vehicle occupant to intuitively recognize the direction to notice and helps ensure that the vehicle occupant will see the gaze target, such as a landscape or scenery.

For example, the notification processing unit 95 may acquire information on the direction in which the gaze target, such as a landscape or scenery, is present on the map data on the basis of the information stored in the viewpoint database 91, and obtain the direction from the traveling position of the own vehicle on the map data acquired on the basis of the output signal of the GPS antenna 29 to the gaze target. Further, the notification processing unit 95 may calculate the elevation angle of the line of sight directed from the current traveling position of the own vehicle on the map data to the gaze target on the basis of the information stored in the viewpoint database 91. On the basis of the direction to the gaze target and the elevation angle of the line of sight, the notification processing unit 95 may make a notification that urges the vehicle occupant to direct his/her line of sight in the direction to notice. The notification of the direction to notice is not necessarily made at high resolution. It may be sufficient that the notification of the direction to notice is made at a resolution enough to urge the vehicle occupant to direct his/her line of sight in a direction in which the gaze target such as a landscape is viewable.

When making the notification of the direction to notice, the notification processing unit 95 may also notify the vehicle occupant of information relevant to the gaze target. For example, the notification processing unit 95 may give the vehicle occupant information on a landscape viewable from the viewpoint. If the gaze target is a historical site, the notification processing unit 95 may give the vehicle occupant information on a commentary on the historical site. The information on the landscape viewable from the viewpoint may be obtained by learning the contents of the image data acquired by the vehicle exterior camera 23 while the vehicle is traveling through the viewpoint, transcribing the contents into texts, and outputting the texts by means of audio outputting or text displaying. The information on a historical site at the viewpoint on the map data may be obtained by learning the contents of the image data and outputting the contents by means of audio outputting or text displaying.

Figure 2:
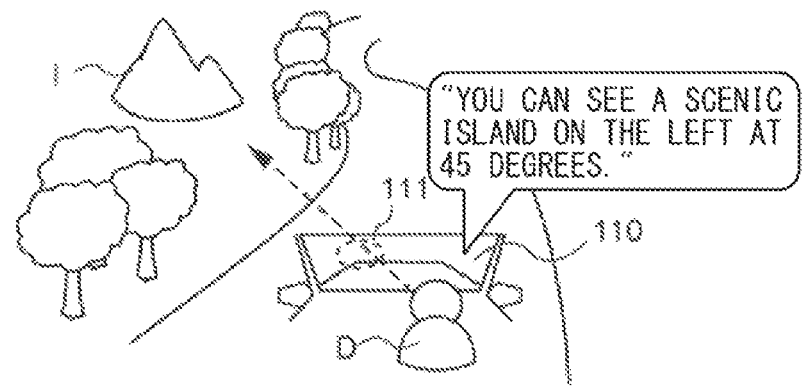
FIG. 2 is an explanatory diagram illustrating an exemplary notification made by a notification processing unit by means of a HUD and a voice guide.

FIG. 2 illustrates an exemplary notification made by the notification processing unit 95 by means of a HUD and a voice guide. In the example illustrated in FIG. 2, the notification processing unit 95 may display a landmark 111 of the target to notice at a position where the line of sight of a driver D directed to an island I through a front windshield 110 intersects with the front windshield 110. Additionally, the notification processing unit 95 may output a voice guide saying, "You can see a scenic island on the left at 45 degrees". The displayed position of the landmark 111 on the front windshield 110 may be set on the basis of the direction from the own vehicle to the island I and the elevation angle of the line of sight determined on the basis of the traveling position of the vehicle and the viewpoint data. Accordingly, the driver 20 makes it possible to look at the island I at an appropriate timing by directing his/her line of sight to the landmark 111. The landmark 111 may be indicated by an icon or text.

The notification processing unit 95 may make the notification of the direction to notice before the own vehicle reaches the viewpoint instead of when the own vehicle reaches the viewpoint. For example, the notification processing unit 95 may make a preliminary notification of the direction to notice when the distance from the own vehicle to the viewpoint becomes less than or equal to a predetermined distance. Alternatively, the notification processing unit 95 may make the preliminary notification of the direction to notice when an estimated time until the own vehicle reaches the viewpoint becomes less than or equal to a predetermined time. The predetermined distance used to determine whether the preliminary notification is to be made may be set as appropriate. The predetermined distance used to determine whether the preliminary notification is to be made may be different depending on the vehicle speed.

Figure 3:
FIG. 3 is an explanatory diagram illustrating an exemplary preliminary notification made by means of the HUD and voice guide.

FIG. 3 illustrates an exemplary notification outputted by means of the HUD and voice guide. In the example illustrated in FIG. 3, the notification processing unit 95 may output a voice guide saying, "You will pass through the forest in 50 meters, and see a scenic island on the left at 45 degrees" at a position 50 meters before the viewpoint. Further, the notification processing unit 95 may display the landmark 111 of the target to notice at the position where the line of sight of the driver D to be directed to the island I through the front windshield 110 when the vehicle reaches the viewpoint intersects with the front windshield 110. This allows the driver 20 to know that he/she will reach the viewpoint in a short time and which direction to notice at the viewpoint in advance. This helps prevent the driver 20 from missing the scenic view.

Figure 4:
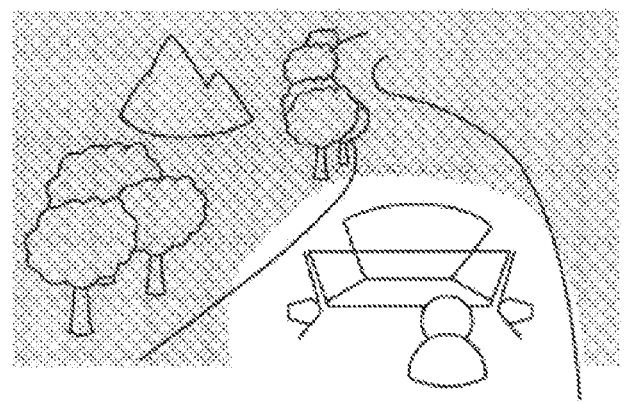
FIG. 4 is an explanatory diagram illustrating an example in which no notification is made by means of the HUD and voice guide.

The notification processing unit 95 may make the notification on the basis of the current date and time. For example, in a case where the landscape viewable from the viewpoint varies depending on the seasons or where the landscape is not viewable in the night-time, the notification processing unit 95 may notify the direction to notice only in an appropriate season or at an appropriate time when a scenic landscape is viewable. For example, as illustrated in FIG. 4, in a case where the island I is not viewable because of being outside an irradiation range of the headlight in the night-time, the notification processing unit 95 may make no notification.

In a case where the viewpoint data is stored together with the information on the season, calendar, and time, for example, the notification processing unit 95 may determine the season or time when the vehicle occupant or the traffic participant has a positive emotion to the gaze target such as a landscape and set the season or time when the notification is to made at the viewpoint. This helps prevent the user from missing a scenic landscape despite of the notification being made, and thus helps prevent the system reliability from decreasing.

[1-8-19. Display Processing Unit]

The display processing unit 97 may display the viewpoint data on the map data appearing on the navigation display 45. This allows the driver looking at the screen of the navigation display 45 of the navigation system to recognize the viewpoint. If the driver recognizes the position of the viewpoint on the map data, the driver makes it possible to direct his/her line of sight to the viewpoint following the notification made by the notification processing unit 95. This further helps prevent the driver from missing a scenic landscape.

[2. Exemplary Operation of Drive Assist Apparatus]

An exemplary operation of the drive assist apparatus 10 according to the present example embodiment will now be described in detail. In the following description, the operation of the drive assist apparatus 10 may be divided into a viewpoint data storing process based on the line of sight of the vehicle occupant, a viewpoint data storing process based on the line of sight of the traffic participant, and a notification control process.

[2-1. Viewpoint Data Storing Process Based on Line of Sight of Vehicle Occupant]

Figure 5:
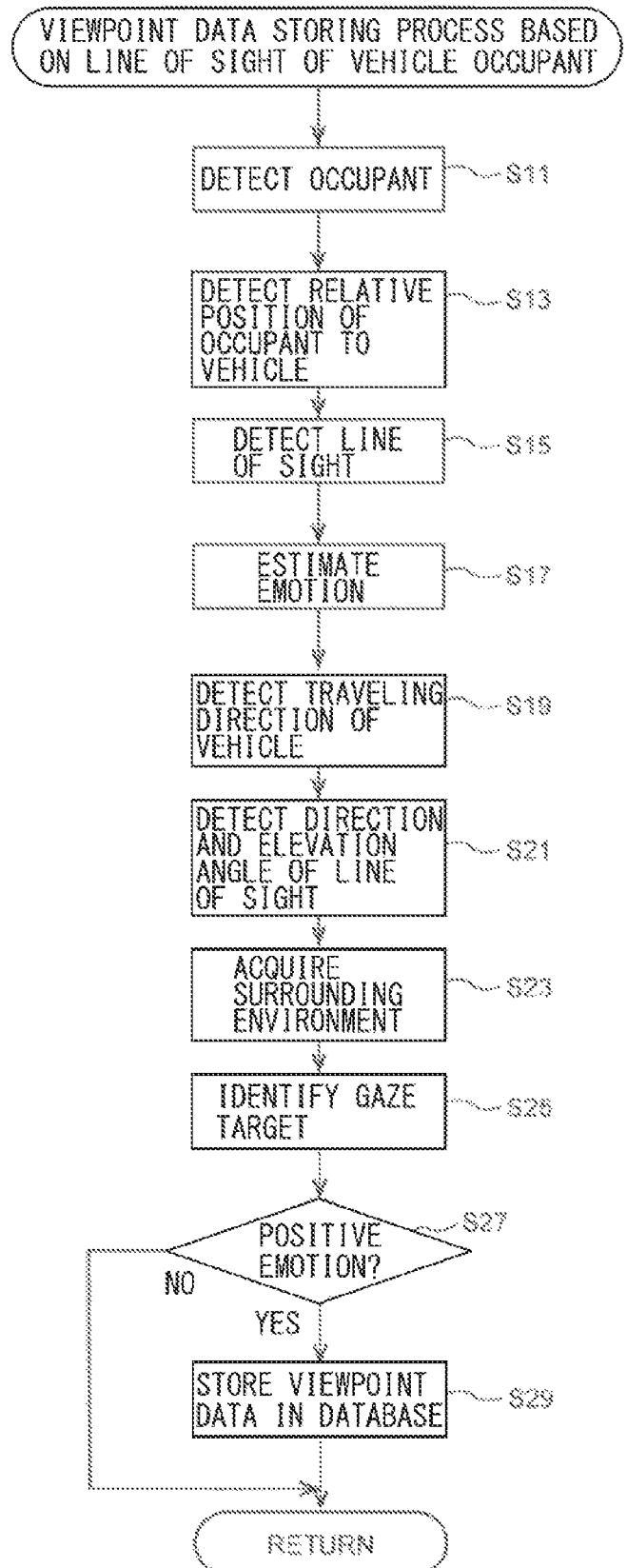
FIG. 5 is a flowchart of an exemplary operation in a viewpoint data storing process executed by a drive assist apparatus according to one example embodiment of the technology on the basis of the line of sight of an occupant in a vehicle.

FIG. 5 is a flowchart illustrating an exemplary operation in the viewpoint data storing process based on the line of sight of the vehicle occupant.

First, the occupant detector 51 in the information processor 50 may detect a vehicle occupant on the basis of the image data received from the vehicle interior camera 21 (Step S11). For example, the occupant detector 51 may detect a vehicle occupant by detecting the face of a known person. Thereafter, the occupant detector 51 may detect a relative position of the detected vehicle occupant to the vehicle (Step S13). For example, the occupant detector 51 may detect the position of the driver or passenger in the vehicle by detecting the distance or relative position between the vehicle interior camera 21 and the detected vehicle occupant. Which the detected vehicle occupant corresponds to, a driver or a passenger, may be thereby determined and the relative position of the driver or passenger to the vehicle may be thereby detected.

Thereafter, the driver's line-of-sight detector 53 and the passenger's line-of-sight detector 57 may respectively detect the line of sight of the driver and the line of sight of the passenger on the basis of the image data received from the vehicle interior camera 21 (Step S15). For example, the driver's line-of-sight detector 53 and the passenger's line-of-sight detector 57 may detect the line of sight by identifying a turning direction of the head of the detected driver or passenger or a moving direction of the eyes of the detected driver or passenger.

Thereafter, the driver's emotion estimator 55 and the passenger's emotion estimator 59 may respectively estimate a driver's emotion and a passenger's emotion on the basis of the image data received from the vehicle interior camera 21 (Step S17). For example, the driver's emotion estimator 55 may estimate at least a positive emotion, such as "delight" or "pleasure", of the driver by analyzing facial data of the driver through the facial analysis based on the FACS theory, and the passenger's emotion estimator 59 may estimate at least a positive emotion, such as "delight" or "pleasure", of the passenger by analyzing facial data of the passenger through the facial analysis based on the FACS theory.

Thereafter, the traveling direction determination unit 69 may determine a traveling direction of the own vehicle on the basis of a change in position of the vehicle transmitted from the GPS antenna 29 (Step S19).

Thereafter, the driver's line-of-sight direction/elevation angle determination unit 71 and the passenger's line-of-sight direction/elevation angle determination unit 73 may respectively determine the direction and elevation angle of the line of sight of the driver and that of the passenger on the basis of the information on the line of sight of the driver or passenger, the information on the relative position to the vehicle, and the information on the traveling position and traveling direction of the vehicle (Step S21). For example, the driver's line-of-sight direction/elevation angle determination unit 71 may determine the position of the driver on the map data, and the passenger's line-of-sight direction/elevation angle determination unit 73 may determine the position of the passenger on the map data, on the basis of the information on the relative position of the driver or passenger to the vehicle and the information on the traveling position of the vehicle. Further, the driver's line-of-sight direction/elevation angle determination unit 71 and the passenger's line-of-sight direction/elevation angle determination unit 73 may respectively identify the direction of the line of sight of the driver and that of the passenger on the map data and calculate the elevation angle of the line of sight of the driver and that of the passenger in the three-dimensional space on the basis of the positional data of the vehicle on the map data, the information on the line of sight of the driver or the passenger, and the information of the traveling direction of the vehicle.

Thereafter, the surrounding environment detector 67 may detect a specific landscape or scenery viewable from the vehicle on the basis of the image data received from the vehicle exterior camera 23 and the information received from the surrounding environment sensor 25 through a known object detection method (Step S23).

Thereafter, the driver's gaze target determination unit 81 determine a gaze target present in front of the line of sight of the driver on the basis of the direction and elevation angle of the line of sight of the driver determined by the driver's line-of-sight direction/elevation angle determination unit 71 and the information on the viewable landscape detected by the surrounding environment detector 67, and the passenger's gaze target determination unit 83 may determine a gaze target present in front of the line of sight of the passenger on the basis of the direction and elevation angle of the line of sight of the passenger determined by the passenger's line-of-sight direction/elevation angle determination unit 73 and the information on the viewable landscape detected by the surrounding environment detector 67 (Step S25). Th landscape or scenery at which the driver or the passenger is gazing is thereby identified.

Thereafter, the viewpoint storing processing unit 87 may determine whether the detected driver or passenger has a positive emotion (Step S27). For example, the viewpoint storing processing unit 87 may determine that the driver or passenger has a positive emotion if the driver's emotion estimated by the driver's emotion estimator 55 or the passenger's emotion estimated by the passenger's emotion estimator 59 changes to a higher level of the "delight" emotion or the "pleasure" emotion. Alternatively, the viewpoint storing processing unit 87 may determine whether the driver or the passenger has a positive emotion on the basis of the proportion of a time interval during which the driver or passenger estimated to have the "delight" or "pleasure" emotion directs his/her line of sight in a specific direction to a time interval during which the vehicle travels in a predetermined traveling section.

If it is not determined that the driver or the passenger has a positive emotion (Step S27: NO), the viewpoint storing processing unit 87 may end the routine and cause the process to return to Step S11. In contrast, if it is determined that the driver or the passenger has a positive emotion (Step S27: YES), the viewpoint storing processing unit 87 may store the viewpoint data in the viewpoint database 91 (Step S29). For example, the viewpoint storing processing unit 87 may store the viewpoint data including the information relevant to the line of sight, such as the information on the direction and elevation angle of the line of sight, the positional data of the vehicle on the map data, and the information on the landscape or scenery at which the driver or passenger is gazing, in the viewpoint database 91.

The viewpoint storing processing unit 87 may store the viewpoint data together with the information on the season, calendar, or time when the driver or the passenger has a positive emotion in the viewpoint database 91. In another case where no gaze target at which the driver or passenger is gazing is detected by the driver's gaze target determination unit 81 or the passenger's gaze target determination unit 83, the viewpoint storing processing unit 87 may cause the process to skip the step of storing the viewpoint data.

The information processor 50 may repeat the routine including Steps S11 to S29 of the viewpoint data storing process based on the line of sight of the vehicle occupant described above. Accordingly, the information processor 50 makes it possible to collect the data on the viewpoint to which the driver or passenger had a positive emotion.

[2-2. Viewpoint Data Storing Process Based on Line of Sight of Traffic Participant]

Figure 6:
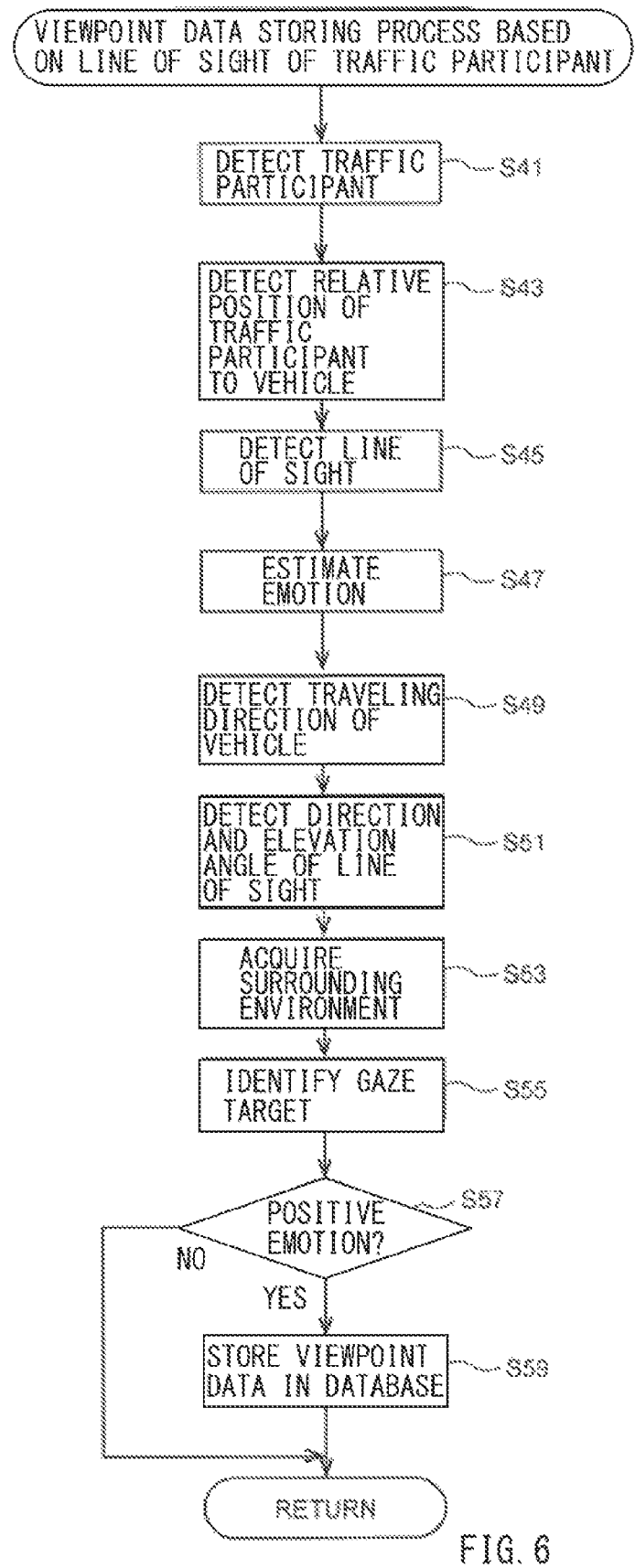
FIG. 6 is a flowchart of an exemplary operation in a viewpoint data storing process executed by the drive assist apparatus according to one example embodiment of the technology on the basis of the line of sight of a traffic participant.

FIG. 6 is a flowchart illustrating an exemplary operation in the viewpoint data storing process based on the line of sight of the traffic participant.

First, the traffic participant detector 61 in the information processor 50 may detect a traffic participant on the basis of the image data received from the vehicle exterior camera 23 (Step S41). For example, the traffic participant detector 61 may detect a traffic participant by detecting the face of a known person. Thereafter, the traffic participant detector 61 may detect a relative position of the traffic participant to the vehicle (Step 43). For example, the traffic participant detector 61 may detect the relative position of the traffic participant on the basis of the distance to the traffic participant received from the vehicle exterior camera 23.

Thereafter, the traffic participant's line-of-sight detector 63 may detect the line of sight of the traffic participant on the basis of the image data received from the vehicle exterior camera 23 (Step S45). For example, the traffic participant's line-of-sight detector 63 may detect the line of sight of the traffic participant by identifying a turning direction of the head of the detected traffic participant and a moving direction of the eyes of the detected traffic participant.

Thereafter, the traffic participant's emotion estimator 65 may estimate a traffic participant's emotion on the basis of the image data received from the vehicle exterior camera 23 (Step S47). For example, the traffic participant's emotion estimator 65 may estimate at least a positive emotion, such as "delight" or "pleasure", of the traffic participant by analyzing facial data of the traffic participant through the facial analysis based on the FACS theory.

Thereafter, the traveling direction determination unit 69 may determine a traveling direction of the own vehicle on the basis of a change in position of the vehicle transmitted from the GPS antenna 29 (Step S49).

Thereafter, the traffic participant's line-of-sight direction/elevation angle determination unit 75 may determine the direction and elevation angle of the line of sight of the traffic participant on the basis of the information on the line of sight of the traffic participant, the information on the relative position to the vehicle, and the information the traveling position and the traveling direction of the vehicle (Step S51). For example, the traffic participant's line-of-sight direction/elevation angle determination unit 75 may determine the position of the traffic participant on the map data on the basis of the information on the relative position of the traffic participant to the vehicle and the information on the traveling position of the vehicle. Further, the traffic participant's line-of-sight direction/elevation angle determination unit 75 may identify the direction of the line of sight of the traffic participant on the map data and calculate the elevation angle of the line of sight of the traffic participant in the three-dimensional space on the basis of the information on the position of the vehicle on the map data, the information on the line of sight of the traffic participant, and the information of the traveling direction on the vehicle.

Thereafter, the surrounding environment detector 67 may detect a specific landscape or scenery viewable from the vehicle on the basis of the image data received from the vehicle exterior camera 23 and the information received from the surrounding environment sensor 25 through a known object detection method (Step S53).

Thereafter, the traffic participant's gaze target determination unit 85 may determine a gaze target present in front of the line of sight of the traffic participant on the basis of the direction and elevation angle of the line of sight of the traffic participant determined by the traffic participant's line-of-sight direction/elevation angle determination unit 75 and the information on the viewable landscape detected by the surrounding environment detector 67 (Step S55). The landscape or scenery at which the traffic participant is gazing is thereby identified.

Thereafter, the viewpoint storing processing unit 87 may determine whether the detected traffic participant has a positive emotion (Step S57). For example, the viewpoint storing processing unit 87 may determine that the traffic participant has a positive emotion if the traffic participant's emotion estimated by the traffic participant's emotion estimator 65 changes to a higher level of the "delight" emotion or the "pleasure" emotion. Alternatively, the viewpoint storing processing unit 87 may determine whether the traffic participant has a positive emotion on the basis of the proportion of a time interval during which the traffic participant estimated to have a "delight" or "pleasure" emotion directs his/her line of sight in a specific direction to a time interval during which the vehicle travels in a predetermined traveling section.

If it is not determined that the traffic participant has a positive emotion (Step S57: NO), the viewpoint storing processing unit 87 may end the routine and cause the process to return to Step S41. In contrast, if it is determined that the traffic participant has a positive emotion (S57: YES), the viewpoint storing processing unit 87 may store the viewpoint data including the information relevant to the line of sight (Step S59), such as the information on the direction and elevation angle of the line of sight, the positional data of the vehicle on the map data, and the information on the landscape or scenery at which the traffic participant is gazing, in the viewpoint database 91.

The viewpoint storing processing unit 87 may store the viewpoint data together with the information on the season, calendar, or time when the traffic participant has a positive emotion in the viewpoint database 91. In another case where no gaze target at which the traffic participant is gazing is detected by the traffic participant's gaze target determination unit 85, the viewpoint storing processing unit 87 may cause the process to skip the step of storing the viewpoint data.

The information processor 50 may repeat the routine including Steps S41 to S59 of the viewpoint data storing process based on the line of sight of the traffic participant described above. Accordingly, the information processor 50 makes it possible to collect the data on the viewpoint to which the traffic participant had a positive emotion.

[2-3. Notification Control Process]

Figure 7:
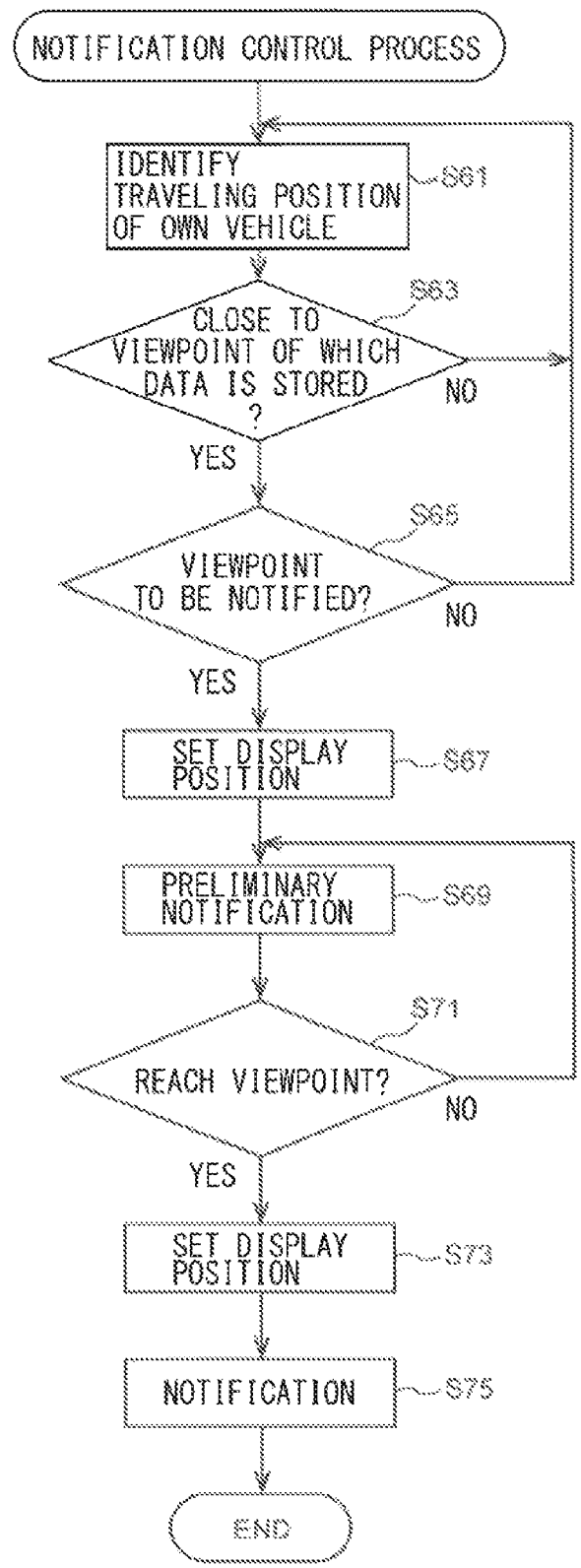
FIG. 7 is a flowchart of an exemplary operation in a notification control process according to one example embodiment of the technology.

FIG. 7 is a flowchart illustrating an exemplary operation in the notification control process.

First, the notification processing unit 95 may identify the traveling position of the own vehicle on the map data on the basis of the positional data received from the GPS antenna 29 (Step S61). Thereafter, the notification processing unit 95 may determine whether the traveling position of the own vehicle is coming closer to the viewpoint of which data is stored in the viewpoint database 91 (Step S63). For example, the notification processing unit 95 may determine whether the distance from the traveling position of the own vehicle to the viewpoint present in front of the own vehicle traveling on the traveling route to the set target point becomes less than or equal to a predetermined distance. In a case where no target point is set, the notification processing unit 95 may identify the traveling position of the own vehicle on the map data and the road on which the own vehicle is traveling, and determine whether the distance from the traveling position of the own vehicle to the viewpoint present in front of the own vehicle becomes less than or equal to the predetermined distance on the basis of the identified traveling position of the own vehicle. The predetermined distance may be a fixed value preliminarily determined, a variable value different between an ordinary road and a high-speed way, or a variable value different depending on the vehicle speed. Alternatively, it may be determined whether the own vehicle is coming closer to the viewpoint on the basis of an estimated arrival time instead of the distance.

If it is not determined that the traveling position of the own vehicle is coming closer to the viewpoint (Step S63: NO), the notification processing unit 95 may cause the process to return to Step S61. In contrast, if it is determined that the traveling position of the own vehicle is coming closer to the viewpoint (Step S63: YES), the notification processing unit 95 may determine whether the viewpoint is to be notified to the vehicle occupant (Step S65). For example, it may be determined whether the current season or date and time corresponds to the past season or date and time—stored in the viewpoint data—when the vehicle occupant or traffic participant had a positive emotion to the viewpoint. That is, in Step S65, it may be determined whether the viewpoint to which the own vehicle is coming closer has a scenic view in the current season or date and time.

If it is not determined that the viewpoint is to be notified to the vehicle occupant (Step S65: NO), the notification processing unit 95 may cause the process to return to Step S61. In contrast, if it is determined that the viewpoint is to be notified to the vehicle occupant (Step S65: YES), the notification processing unit 95 may set a HUD position on the front windshield (Step S67). For example, the notification processing unit 95 may acquire the information on the direction in which the gaze target, such as a landscape, is present on the map data on the basis of the information stored in the viewpoint database 91, and calculate the direction from the traveling position of the own vehicle on the map data, which is identified on the basis of the output signal of the GPS antenna 29, to the gaze target. Further, the notification processing unit 95 may calculate the elevation angle of the line of sight directed from the current traveling position of the own vehicle on the map data to the gaze target on the basis of the information stored in the viewpoint database 91. The notification processing unit 95 may set the display position at a position where the line of sight of the vehicle occupant directed to the gaze target through the front windshield intersects with the front windshield.

Thereafter, the notification processing unit 95 may control driving of the HMI 43 to preliminarily notify the vehicle occupant that the own vehicle will pass through the viewpoint in a short time (Step S69). For example, the notification processing unit 95 may display a mark or icon at the display position set on the front windshield. Additionally, the notification processing unit 95 may generate a voice or a notification sound, or display a notification message. For example, the notification processing unit 95 may notify the vehicle occupant of the direction to notice by displaying the direction on the front windshield through an augmented reality (AR) displaying method. This allows the vehicle occupant to intuitively recognize the direction to notice.

Thereafter, the notification processing unit 95 may determine whether the traveling position of the own vehicle has reached the viewpoint of which data is stored in the viewpoint database 91 (Step S71). For example, the notification processing unit 95 may determine whether the distance from the traveling position of the own vehicle to the viewpoint becomes less than or equal to a predetermined distance, which may be several meters. The notification processing unit 95 may determine whether the own vehicle has reached the viewpoint on the basis of an estimated arrival time instead of the distance.

If it is not determined that the traveling position of the own vehicle has reached the viewpoint (Step S71: NO), the notification processing unit 95 may cause the process to return to Step S69. In contrast, if it is determined that the traveling position of the own vehicle has reached the viewpoint (Step S71: YES), the notification processing unit 95 may set the HUD position on the front windshield at which the direction to notice is to be displayed, as in the process in the Step S67 (Step S73). Thereafter, the notification processing unit 95 may control driving of the HMI 43 to notify the vehicle occupant of the direction to notice, as in the process in Step S69 (Step S75). The notification of the direction to notice, which is outputted from the notification processing unit 95 by means of audio outputting or visual displaying when the vehicle arrives at the viewpoint may have different contents from the preliminary notification. The notification processing unit 95 may notify the vehicle occupant of the direction to notice together with the information relevant to the gaze target. For example, the notification processing unit 95 may notify the vehicle occupant of the landscape viewable from the viewpoint. If the gaze target is a historical site, the notification processing unit 95 may notify the vehicle occupant of information on a commentary on the historical site in addition to the direction to notice.

The information processor 50 may repeat the routine including Steps S61 to S75 of the notification control process described above. This allows the driver to recognize which direction to notice when reaching the viewpoint with a scenic view. This helps prevent the driver from missing the scenic view even if the scenic view is viewable in a limited time during the traveling of the vehicle.

[3. Exemplary Configuration of Administrative Server]

An exemplary configuration of the administrative server 5 will now be described.

Figure 8:
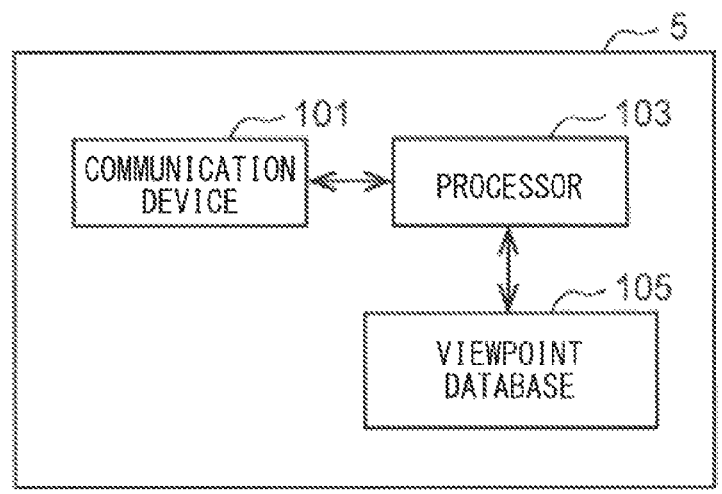
FIG. 8 is a block diagram illustrating an exemplary configuration of an administrative server according to one example embodiment of the technology.

FIG. 8 is a block diagram illustrating an exemplary configuration of the administrative server 5 according to the present example embodiment.

The administrative server 5 may include a communication device 101, a processor 103, and the viewpoint database 105.

The communication device 101 may include an interface to communicate with the drive assist apparatus 10 mounted on each vehicle. The interface included in the communication device 101 may have specifications in accordance with the communication network. In one embodiment, the communication device 101 may correspond to a "second communicator".

The viewpoint database 105 may be a memory such as a RAM, or a storage medium, such as a HDD, a CD, a DVD, an SSD, a USB flash drive, or another storage device.

The processor 103 may include an arithmetic operation unit, such as a central processing unit (CPU) or a micro processing unit (MPU), and an imaging processing unit, such as a graphic processing unit (GPU). The arithmetic operation unit may perform various calculations by executing programs stored in a non-illustrated storage.

The processor 103 may receive the viewpoint data from the drive assist apparatus 10 mounted on each vehicle and store the viewpoint data in the viewpoint database 105. Additionally, the processor 103 may store the information on the level of the positive emotion of the vehicle occupant or the traffic participant together with the viewpoint data.

Further, the processor 103 may receive the information on the traveling position of the vehicle from the drive assist apparatus 10 mounted on each vehicle. The processor 103 may retrieve the data on the viewpoint present within a predetermined range from the traveling position from the viewpoint data stored in the viewpoint database 105, and transmit the retrieved viewpoint data to the vehicle. When transmitting the viewpoint data, the processor 103 may convert the level of the positive emotion into the level of recommendation of the viewpoint for each piece of the viewpoint data.

[4. Exemplary Operation of Administrative Server]

An exemplary operation of the administrative server according to the present example embodiment will now be described in detail. In the following description, the operation of the administrative server may be divided into a viewpoint storing process and a viewpoint data transmitting process.

[4-1. Viewpoint Storing Process]

Figure 9:
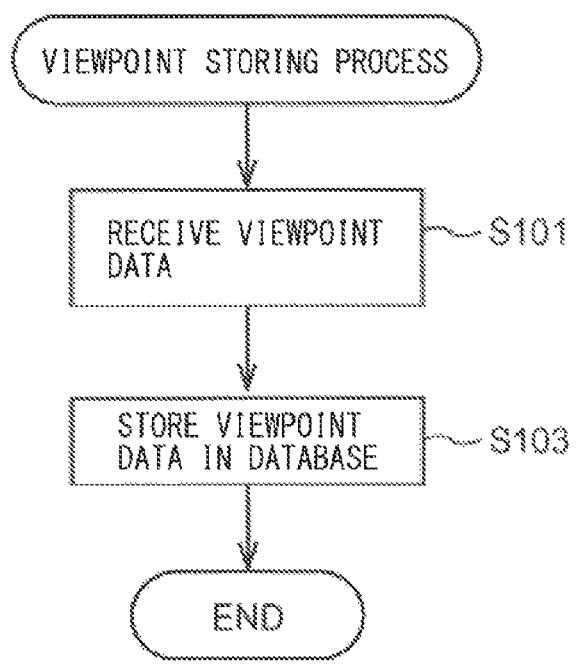
FIG. 9 is a flowchart of an exemplary operation in a viewpoint storing operation process executed by the administrative server according to one example embodiment of the technology.

FIG. 9 is a flowchart illustrating an exemplary operation in the viewpoint storing process.

First, the processor 103 in the administrative server 5 may receive the viewpoint data from the drive assist apparatus 10 mounted on each vehicle (Step S101). The processor 103 may receive the information on the level of the positive emotion of the vehicle occupant or the traffic participant as well as the viewpoint data.

Thereafter, the processor 103 may store the received viewpoint data in the viewpoint database 105 (Step S103). The processor 103 may repeat Steps S101 to S103 of the viewpoint storing process. The viewpoint data collected by a plurality of vehicles may be thereby accumulated in the viewpoint database 105 of the administrative server 5.

[4-2. Viewpoint Data Transmitting Process]

Figure 10:
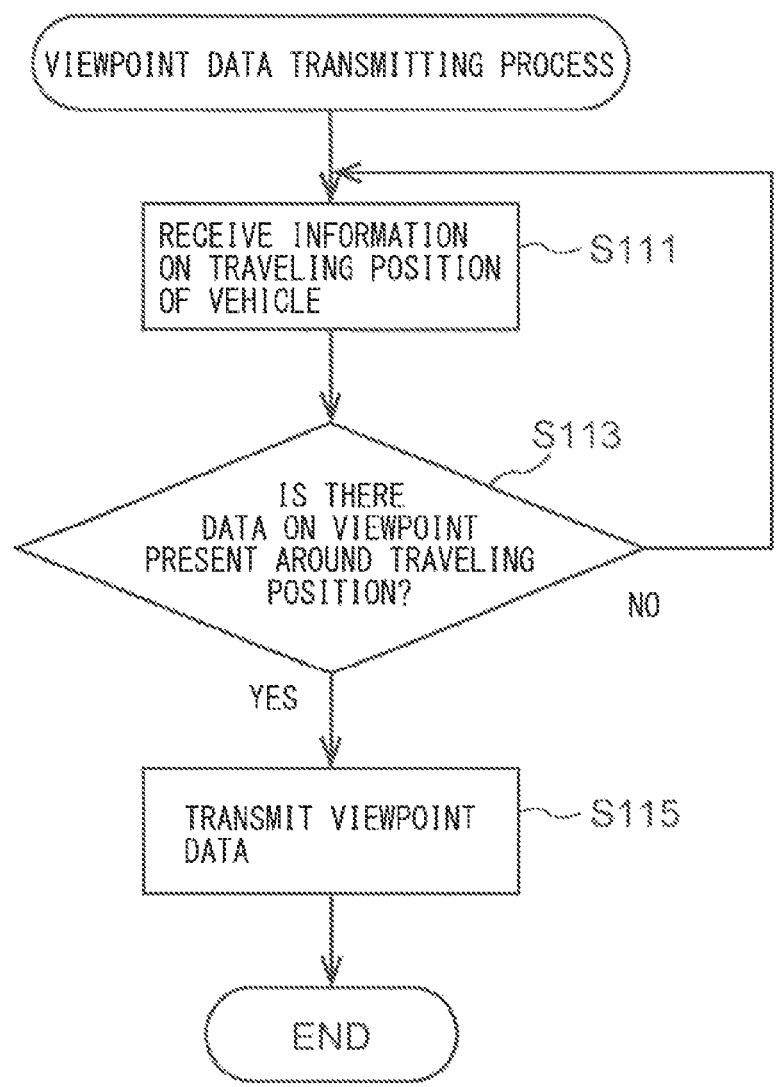
FIG. 10 is a flowchart of an exemplary operation in a viewpoint information transmitting process executed by the administrative server according to one example embodiment of the technology.

FIG. 10 is a flowchart illustrating an exemplary operation in the viewpoint data transmitting process.

First, the processor 103 may receive the information on the traveling position of the vehicle from the drive assist apparatus 10 mounted on each vehicle (Step S111). Thereafter, the processor 103 may determine whether the viewpoint database 105 includes data on the viewpoint present around the received traveling position (Step S113). For example, the processor 103 may determine whether the viewpoint database 105 includes data on the viewpoint present within a predetermined distance from the traveling position. Alternatively, the processor 103 may determine whether the viewpoint database 105 includes data on the viewpoint present within a predetermined range in front of the vehicle traveling in the traveling direction by acquiring the information on the traveling direction of the vehicle and the traveling route to the target point in addition to the information on the traveling position of the vehicle.

If it is not determined that there is the data on the viewpoint present around the traveling position (Step S113: NO), the processor 103 may cause the process to return Step S111. In contrast, if it is determined that there is the data on the viewpoint present around the traveling position (Step S113: YES), the processor 103 may extract the corresponding viewpoint and transmit the data on the viewpoint to the drive assist apparatus 10 of the vehicle (Step S115). When transmitting the viewpoint data, the processor 103 may convert the level of the positive emotion into the level of recommendation of the viewpoint for each piece of the viewpoint data.

When the vehicle is passing through the viewpoint of which data is received from the administrative server 5, the drive assist apparatus 10 makes it possible to notify the vehicle occupant of the direction to notice, as in the case with the viewpoint of which data is stored in the viewpoint database 91 of the own vehicle. This helps prevent the vehicle occupant from missing a scenic view even in a traveling area where the vehicle occupant travels for the first time, and allows the vehicle occupant to enjoy the scenic view at an appropriate timing.

According to the drive assist apparatus 10 and the data collection system 1 of the example embodiments described above, it is possible to collect the data on the viewpoint to which the vehicle occupant or the traffic participant had a positive emotion, and notify the vehicle occupant or the traffic participant passing through the viewpoint of the direction to notice. This allows the vehicle occupant or the traffic participant to enjoy a scenic view viewable in a short time at an appropriate timing without looking for the direction to notice when reaching the viewpoint. According to the foregoing example embodiments, it is possible to help prevent the vehicle occupant in the traveling vehicle from missing a scenic view by presenting appropriate information to the vehicle occupant.

Further, according to the drive assist apparatus 10 of the foregoing example embodiments, the preliminary notification of the viewpoint may be made before the vehicle reaches the viewpoint. This allows the vehicle occupant to know in advance that the vehicle will pass through the viewpoint. Accordingly, it is possible to ensure that the vehicle occupant will enjoy the scenic view at an appropriate timing.

Some example embodiments of the technology are described in detail above with reference to the accompanying drawings. It should be appreciated that the example embodiments of the technology described above are mere examples and are not intended to limit the scope of the technology. It should be also appreciated that various omissions, replacements, and modifications may be made in the foregoing example embodiments described herein, without departing from the scope of the technology. The technology is intended to include such modifications and alterations in so far as they fall within the scope of the appended claims or the equivalents thereof.

Although the drive assist apparatus 10 according to the foregoing example embodiments receives and transmits the viewpoint data by communicating with the administrative server 5, the technology should not be limited to this example. Alternatively, the drive assist apparatus 10 may serve just as the drive assist apparatus without receiving/transmitting the information from/to the administrative server 5.

The information processor 50 in the drive assist apparatus 10 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the information processor 50. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the information processor 50 in the drive assist apparatus 10 illustrated in FIG. 1.

The invention claimed is:

1. A drive assist apparatus comprising:
a processor including
a line-of-sight detector configured to detect information on a line of sight of one or both of a vehicle occupant present in a vehicle and a traffic participant present around the vehicle, and
an emotion estimator configured to estimate an emotion of the one or both of the vehicle occupant and the traffic participant; and
a storage configured to store, when the emotion estimated by the emotion estimator is detected as a positive emotion, data on a viewpoint including information on a position of the vehicle on map data and information on the line of sight,
the processor further including a notification processing unit configured to make, on a basis of the data on the viewpoint stored in the storage, a notification of information on a direction to notice to the vehicle occupant present in the vehicle traveling through a location corresponding to the viewpoint,
wherein the information on the line of sight includes information on a direction and an elevation angle of the line of sight.

2. The drive assist apparatus according to claim 1, wherein
the processor further includes:
a surrounding environment detector configured to acquire image data of a landscape outside the vehicle; and a gaze target determination unit configured to determine a gaze target at which the one or both of the vehicle occupant and the traffic participant are gazing, on a basis of the information on the line of sight detected by the line-of-sight detector and the image data of the landscape acquired by the surrounding environment detector.

3. The drive assist apparatus according to claim 2, wherein the storage is configured to store the data on the viewpoint together with information on at least one of a season, calendar, and/or time when the emotion estimated by the emotion estimator is detected as the positive emotion, and the notification processing unit is configured to make the notification on a basis of a date and time when the vehicle travels through the viewpoint.

4. The drive assist apparatus according to claim 1, wherein the storage is configured to store the data on the viewpoint together with information on at least one of a season, calendar, and/or time when the emotion estimated by the emotion estimator is detected as the positive emotion, and the notification processing unit is configured to make the notification on a basis of a date and time when the vehicle travels through the viewpoint.

5. A data collection system comprising:

a drive assist apparatus configured to be mounted on a vehicle, the drive assist apparatus including a processor, a storage and a first communication device; and an administrative server configured to communicate with the drive assist apparatus, the administrative server including a database and a second communication device, wherein the processor includes:

a line-of-sight detector configured to detect information on a line of sight of one or both of a vehicle occupant present in a vehicle and a traffic participant present around the vehicle; and an emotion estimator configured to estimate an emotion of the one or both of the vehicle occupant and the traffic participant, the storage is configured to store, when the emotion estimated by the emotion estimator is detected as a positive emotion, data on a viewpoint including information on a position of the vehicle on map data and information on the line of sight, the processor further includes a notification processing unit configured to make, on a basis of the data on the viewpoint stored in the storage, a notification of information on a direction to notice to the vehicle occupant present in the vehicle traveling through a location corresponding to the viewpoint, the first communication device is configured to transmit the data on the viewpoint to the administrative server, the database is configured to store the data on the viewpoint received from the drive assist apparatus, and the second communication device is configured to transmit the data on the viewpoint stored in the storage to the drive assist apparatus, wherein the information on the line of sight includes information on a direction and an elevation angle of the line of sight.

6. A drive assist apparatus comprising:

circuitry; and a storage, wherein the circuitry is configured to detect information on a line of sight of one or both of a vehicle occupant present in a vehicle and a traffic participant present around the vehicle, and estimate an emotion of the one or both of the vehicle occupant and the traffic participant, the storage is configured to store, when the estimated emotion is detected as a positive emotion, data on a viewpoint including information on a position of the vehicle on map data and information on the line of sight, and the circuitry is further configured to make, on a basis of the data on the viewpoint stored in the storage, a notification of information on a direction to notice to the vehicle occupant present in the vehicle traveling through a location corresponding to the viewpoint, wherein the storage is configured to store the data on the viewpoint together with information on at least one of a season, calendar, and/or time when the emotion estimated by the emotion estimator is detected as the positive emotion, and wherein the circuitry is configured to make the notification on a basis of a date and time when the vehicle travels through the viewpoint.

7. The drive assist apparatus according to claim 6, wherein the circuitry is configured to:

acquire image data of a landscape outside the vehicle; and determine a gaze target at which the one or both of the vehicle occupant and the traffic participant are gazing, on a basis of the detected information on the line of sight and the acquired image data of the landscape.

* * * * *